United States Patent [19]
Pommer, II

[11] Patent Number: 4,598,174
[45] Date of Patent: Jul. 1, 1986

[54] CIRCUIT FOR DETECTING KEYPAD CONDITIONS IN A MICROPROCESSOR CONTROLLED TELEPHONE INSTRUMENT

[75] Inventor: Karl E. Pommer, II, Huntsville, Ala.

[73] Assignee: GTE Communication Systems Corp., Northlake, Ill.

[21] Appl. No.: 670,084

[22] Filed: Nov. 13, 1984

[51] Int. Cl.$^4$ ............................................. H04M 1/00
[52] U.S. Cl. .............................. 179/84 VF; 179/84 R; 179/81 R; 179/90 K
[58] Field of Search ............ 179/81 R, 84 R, 84 VF, 179/84 A, 84 L, 90 AN, 90 B, 90 BB, 90 BD, 90 CS

[56] References Cited

U.S. PATENT DOCUMENTS

| | | | |
|---|---|---|---|
| 4,298,775 | 11/1981 | Buck et al. | 179/81 R |
| 4,453,040 | 6/1984 | Wolf et al. | 179/81 R X |
| 4,463,221 | 7/1984 | Soulliard et al. | 179/81 R X |
| 4,475,013 | 10/1984 | Lee et al. | 179/90 B X |
| 4,503,291 | 3/1985 | Von Holten et al. | 179/90 AN |
| 4,513,175 | 4/1985 | Smith | 179/84 VF X |

Primary Examiner—James L. Dwyer
Attorney, Agent, or Firm—Robert J. Black; Gregory G. Hendricks

[57] ABSTRACT

A technique for evaluating keypad conditions while utilizing only a minimum number of ports in a microprocessor involved in control of a telephone instrument. Because of the limited number of ports available and necessity to also evaluate conditions of mode selecting strap switches, the utilization of a reduced number of ports is highly desirable in such an enviroment. Such a reduction becomes an absolute necessity particularly in dealing in those enviroments that include random access memories, read only memories, pulse dialers, integrated circuits and liquid crystal displays. A combination of diode gating, resistive decoupling and time multiplexing techniques are used to match the input/output requirements to the available ports of a specific microprocessor.

8 Claims, 1 Drawing Figure

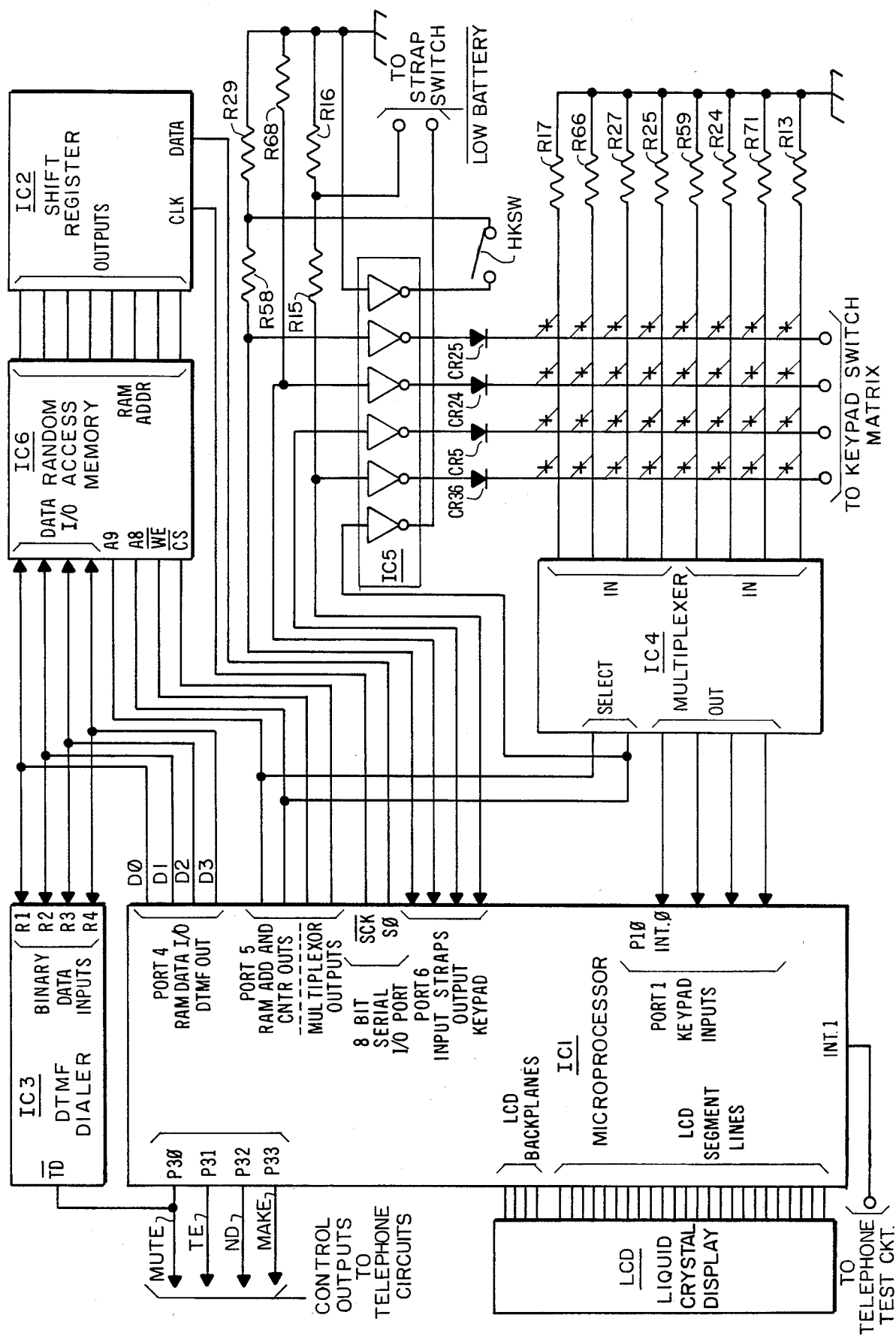

CIRCUIT FOR DETECTING KEYPAD CONDITIONS IN A MICROPROCESSOR CONTROLLED TELEPHONE INSTRUMENT

BACKGROUND OF THE INVENTION

1. Field of the Invention

This invention pertains to microcomputer controlled telephone instruments and more particularly to a technique for reducing the number of ports utilized in connection with keypad detection and the detection of information on wired-in strap switches employed for inputting information to the microprocessor used in such a telephone instrument.

2. Background Art

A number of microprocessors are available commercially which have found appropriate use in the control of telephone instruments. One of these is Model No. COP444C made by National Semiconductor Corporation. This CMOS microcontroller includes an 8 pin input/output port, a 4 pin input/output port, a 4 pin output only port, a 4 pin input only port and a single serial input/output port. This arrangement distributed over 28 pins is representative of many microprocessors that would find useful application in telephone instruments. Another CMOS microcomputer, the NEC UPD7503 has 5 ports plus a serial input/output port and 2 interrupt pins in a 64 pin format. This unit includes an additional 28 pins for use as outputs to a liquid crystal display.

In a typical microprocessor controlled telephone instrument not including a liquid crystal display for example, an output port having 4 pins for peripheral device state control is required as are two 4 pin ports for an associated keypad plus strap switches, a single 8 pin output port plus a 4 pin port for random access memory and a 4 pin port for output to a DTMF (Dual Tone Multi-frequency) integrated circuit. In addition, a serial input/output port may be utilized for accessing a liquid crystal display driver arrangement. From the above it will be obvious that without multiplexing a minimum of 30 pins is usually required for use on a microcomputer involved in a microprocessor controlled telephone instrument. Clearly the above described units are insufficient in their capabilities to meet the requirement of today's state of the art designs.

Typical of state of the art telephone design is that exhibited in the "Hangtel" telephone manufactured by American Telecommunications Corporation. In this unit, a microprocessor manufactured by National Semiconductor and identified as COP411L which is quite similar the COP444C previously described, is employed. The utilization of the microprocessor is similar to the scheme outlined in an application note entitled COP Note 3, "Design Considerations for a COP420C-Based Telephone Line Powered Repertory Dialer" which appears on page 9-118 of the COPS Microcontrollers Data Book published by National Semiconductor Corporation in 1982.

Accordingly, it is the object of the present invention to provide a technique for effectively being able to utilize state of the art single-chip microcomputers having fewer than the necessary ports and count of pins that would normally be required, without sacrificing any of the features felt to be required in a microprocessor controlled telephone of current design.

SUMMARY OF THE INVENTION

In the present invention which is implemented in a microprocessor controlled telephone instrument, a NEC UPD7503 single-chip CMOS microcomputer described above is utilized. This particular microcomputer is equipped as previously noted with 5 ports each of 4 pins plus a serial input/output port of three pins and two interrupt pins plus a total of 28 pins dedicated to driving a liquid crystal display. The above functions are included within a 64 pin package. An output port of 4 pins is utilized for telephone control on a dedicated basis. An additional 4 pin port is dedicated to the receipt of input from the keypad or from the multiplexer integrated circuit that may be interspersed between the keypad and the micrprocessor to expand the total number of outputs available from the keypad. An additional 4 terminal port is multiplexed between the dual tone multifrequency (DTMF) integrated circuit output and as a data input/output bus to an associated random access memory (RAM).

Another 4 terminal port is multiplexed to the address and control inputs of a random access memory (RAM) while two of the the terminals are utilized for control of the keypad multiplexer when such circuitry is provided. The final input/output 4 terminal port has 4 input connections to a plurality of strap switches employed for mode control in the present telephone design while outputs to the keypad control circuitry are multiplexed to the same four terminals. A serial port consisting of clock and data input/output lines is used to establish and 8-bit address for random access memory via an integrated circuit shift register. Two terminals are dedicated to interrupt signals, one of which is level sensitive and one of which is edge sensitive. These are utilized to provide inputs for special circuitry features existing in the present telephone's design. The remaining pins on the microprocessor are utilized for power supply and clock circuitry.

The net result of the present technique is to effectively multiplex a number of circuit inputs and outputs to a microprocessor in such a manner as to reduce the total number of ports required, otherwise, the total number of ports would have to be increased from the present five in the microcomputer being employed to a total of 10 parallel input and/or output ports, embracing a total of 40 pins, or 20 more pins than are actually provided on the microcomputer employed.

DESCRIPTION OF THE PREFERRED EMBODIMENT

Referring now to the single FIGURE of the accompanying drawings, a single-chip CMOS microprocessor such as NEC is UPD7503 is shown and designated IC1. Directly connected on a dedicated basis, to microcomputer IC1 is a liquid crystal display (LCD) adapted to display 12 digits of seven segments each. Commercial units, such as described, are manufactured by Seiko Instruments USA Incorporated. Details of the liquid crystal display have not been shown, in as much, as they do not form a portion of the present invention.

Also connected to microprocessor IC1 on a dedicated basis are 4 control outputs to telephone circuitry, one of which is also connected to the enable input (TD) of the DTMF dialer integrated circuit IC3. This unit is like that manufactured by National Semiconductor and designated by model TP53130N. A dedicated 4 terminal input port on microprocessor IC1 received information from over leads from multiplexer IC4 which is a "Quad and-or select Gate" CMOS integrated circuit also manufactured by National Semiconductor under their part no. CD4019BC.

To achieve duality of the remaining ports on IC1 a number of different techniques are employed.

For Example, a 4 bit parallel output port is used to supply the two control select lines to the multiplexor IC4, the 2 bits of the address and the chip select and write control lines for the random access memory IC6. To finish the remaining outputs to the random access memory, a serial output port consisting of a clock line and a serial output data line are used to feed information into a shift register, designated IC2 a National CD4015, which is used to change the serial 8 bits of address into a parallel output for the random access memory. A further output port of 4 bits performing an input/output function in a parallel fashion is used to access the data input and output of the random access memory designated IC6. In addition, it supplies data to the DTMF integrated circuit performing the tone dialing function.

Another parallel port of 4 bits is used to first take the input data from the strap switches which are used to control the mode of operation of the telephone. Second, this port is used to supply an output to the control lines of the keypad via an inverting integrated circuit IC5, manufactured by National Semiconductor Corporation and designated CD4049C. The output voltage from each individual strap switch must be decoupled by a resistor to isolate it from the output data transmitted from the port of the microprocessor to the keypad control lines. The keypad's column lines at the output of IC5 are decoupled from one another by a decoupling diode (CR5, CR24, CR35, CR36) such that when more than one switch element is closed on the same keypad row, then a high output on one line will not be loaded by low output on another column line.

The output row lines from the keypad are then fed to the multiplexer ICU, an integrated circuit manufactured by National Semiconductor and designated a CD4019BC such that they can be selected and fed back to the aforementioned input port dedicated to the keypad matrix. The control lines for this multiplexer integrated circuit are also simplexed with the aforementioned output port supplying address and control data to the random access memory designated IC6.

The strap swiches take the form of either an open-circuit representing a logic "zero" state or a switch closure to a positive voltage, logic "one" state. The output from the switch is applied to a terminating pull-down resistor which is subsequently coupled to the above mentioned decoupling resistor separating the strap switches from the port lines associated with both the strap switches and the output supplied to the column lines for the keypad.

By virtue of the outlined circuitry, the multiple utilization of the ports and their included terminals on microprocessor IC1 has been effectively increased with the advantages achieved thereon being obvious.

While but a single embodiment of the present invention has been shown, it will be obvious to those skilled in the art that numerous modifications may be made without departing from the scope of the present invention which shall be limited only by the scope of the claims appended hereto.

What is claimed is:

1. A circuit arrangement adapted to maximize the utilization of a microprocessor associated with a telephone comprising: a microprocessor including a plurality of four pin ports and a serial output port; the pins of a first port connected as an output to the circuitry of an associated telephone; said serial output port connected to a shift register; said shift register further including a plurality of parallel circuit outputs connected to a random access memory; the pins of a second port connected as inputs to said random access memory; the pins of a third port also each connected to data in-out connections of said random access memory and each pin of said third port also connected to a DTMF dialer circuit; and one of said pins of said first port also connected to an enable input of said DTMF dialer circuit.

2. A circuit arrangement as claimed in claim 1 wherein: there is further included a liquid crystal display and a plurality of circuit connections between said liquid crystal display and said microprocessor.

3. A circuit arrangement as claimed in claim 1 wherein: there is further included a keypad associated with said telephone including a plurality of column output lines connected to the pins of a fourth port; said keypad further including a plurality of parallel row output conductors connected to a multiplexer; said multiplexer including a plurality of outputs connected to the pins of a fifth port; and a pair of select outputs from said multiplexer connected to two of the pins of said second port;

4. A circuit arrangement as claimed in claim 3 wherein: there is further included an output from at least one strap switch connected to at least one of the pins of said fourth port and a circuit conductor from at least one of said strap switches connected to one of said pins of said second port.

5. A circuit arrangement as claimed in claim 4 wherein: said telephone further includes a hookswitch including circuit connections to said fourth port.

6. A circuit arrangement as claimed in claim 4 wherein: there is further included an inverter circuit included in each column output line connected to the pins of said fourth port.

7. A circuit arrangement as claimed in claim 6 wherein: each of said column output lines further include a diode serially connected between said inverter and said keypad.

8. A circuit arrangement as claimed in claim 4 wherein: the output voltage from said strap switch is decoupled by a resistor element to inhibit any effect on output data from said microprocessor to said keypad control lines.

* * * * *